United States Patent [19]

Posso

[11] 4,312,548
[45] Jan. 26, 1982

[54] DRAWER UNIT FOR STORING CASES NORMALLY CONTAINING MAGNETIC TAPE CASSETTES

[76] Inventor: Patrick Posso, 10 avenue Jurigoz, Lausanne, Switzerland, CH 1006

[21] Appl. No.: 147,581

[22] Filed: May 7, 1980

[30] Foreign Application Priority Data

May 14, 1979 [FR] France ................. 79 12219

[51] Int. Cl.³ .......................... A47B 63/00
[52] U.S. Cl. ...................... 312/9; 312/183; 206/387; 211/55
[58] Field of Search ................. 312/8, 9, 13, 14, 183, 312/111; 211/40, 52, 55; 206/387

[56] References Cited

U.S. PATENT DOCUMENTS

| | | | |
|---|---|---|---|
| 537,853 | 4/1895 | Ramsay | 211/55 |
| 1,045,317 | 11/1912 | Musil | 211/55 |
| 1,699,025 | 1/1929 | Schulz | 211/55 |
| 2,067,051 | 1/1937 | Hall | 211/55 |
| 2,751,088 | 6/1956 | Hargett | 211/55 |
| 2,873,859 | 2/1959 | Gates | 211/55 |
| 3,515,283 | 6/1970 | Poteat | 211/55 |
| 3,703,326 | 11/1972 | Riviers | 312/111 |
| 3,777,897 | 12/1973 | Gray | 211/55 |

FOREIGN PATENT DOCUMENTS

| | | | |
|---|---|---|---|
| 348417 | 2/1922 | Fed. Rep. of Germany | 312/183 |
| 702647 | 1/1941 | Fed. Rep. of Germany | 312/183 |
| 863411 | 4/1941 | France | 312/813 |
| 1156 | of 1900 | United Kingdom | 312/183 |
| 2031381 | 4/1980 | United Kingdom | 206/387 |

Primary Examiner—Victor N. Sakran
Attorney, Agent, or Firm—James E. Nilles

[57] ABSTRACT

The present invention relates to a drawer unit for storing cases normally containing magnetic tape cassettes, wherein the drawer unit comprises separator partitions fast with the bottom and with the side walls thereof, and inclined downwardly to the rear and upwardly to the front, in order to define compartments in which the cases may be stored in inclined position.

4 Claims, 9 Drawing Figures

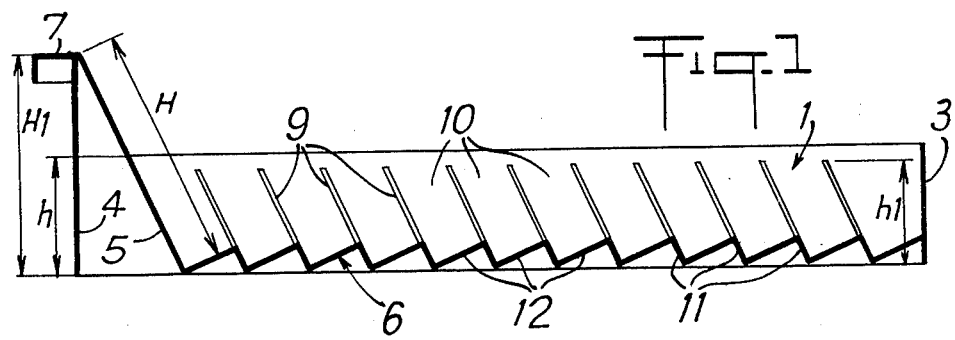
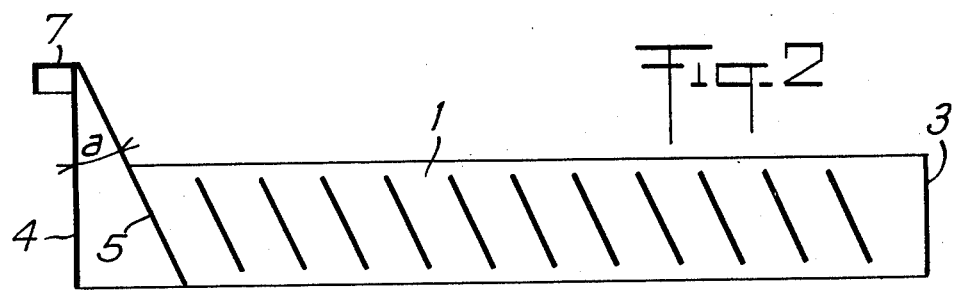
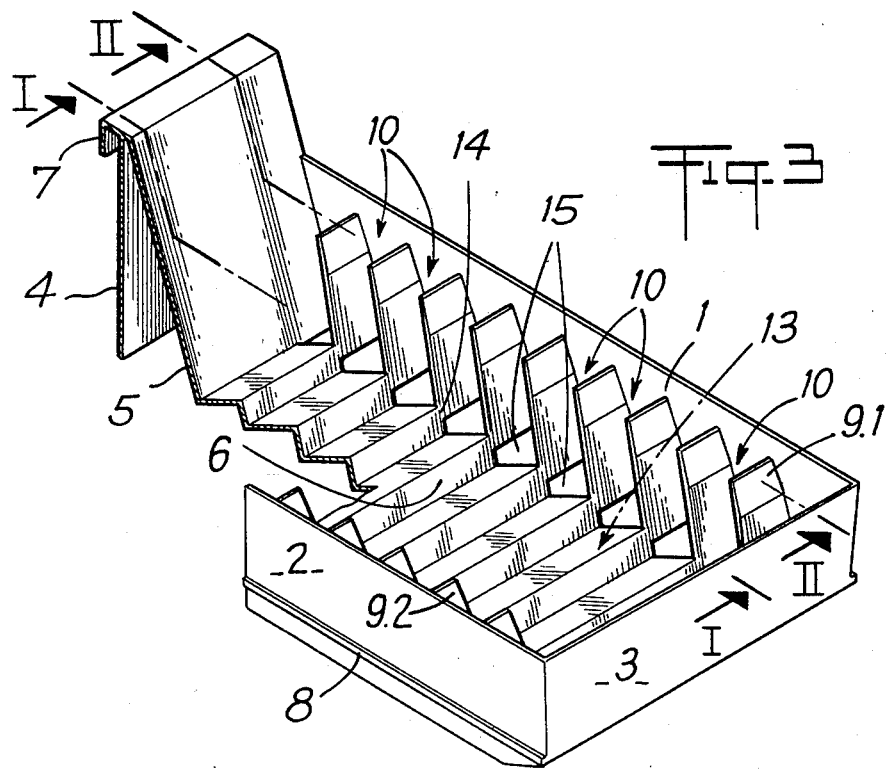

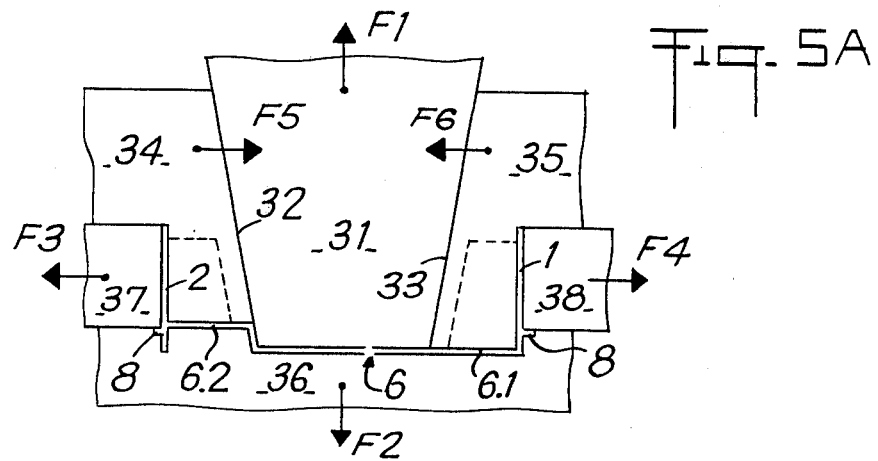
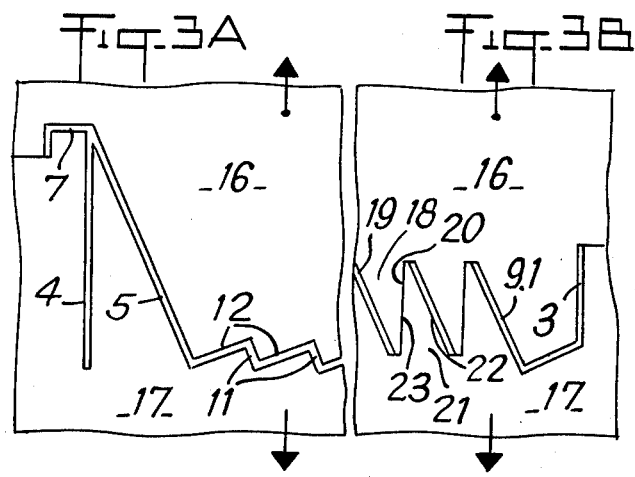
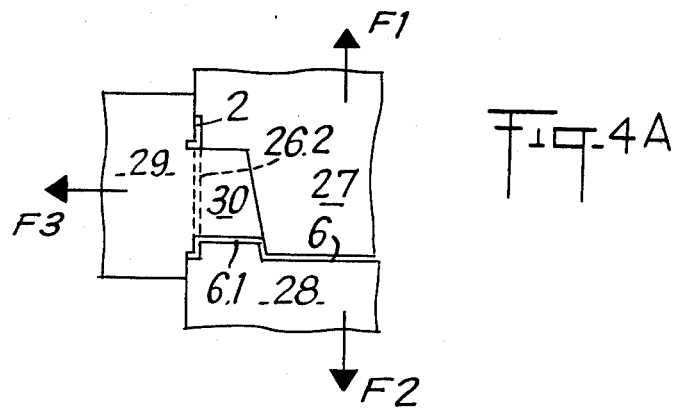

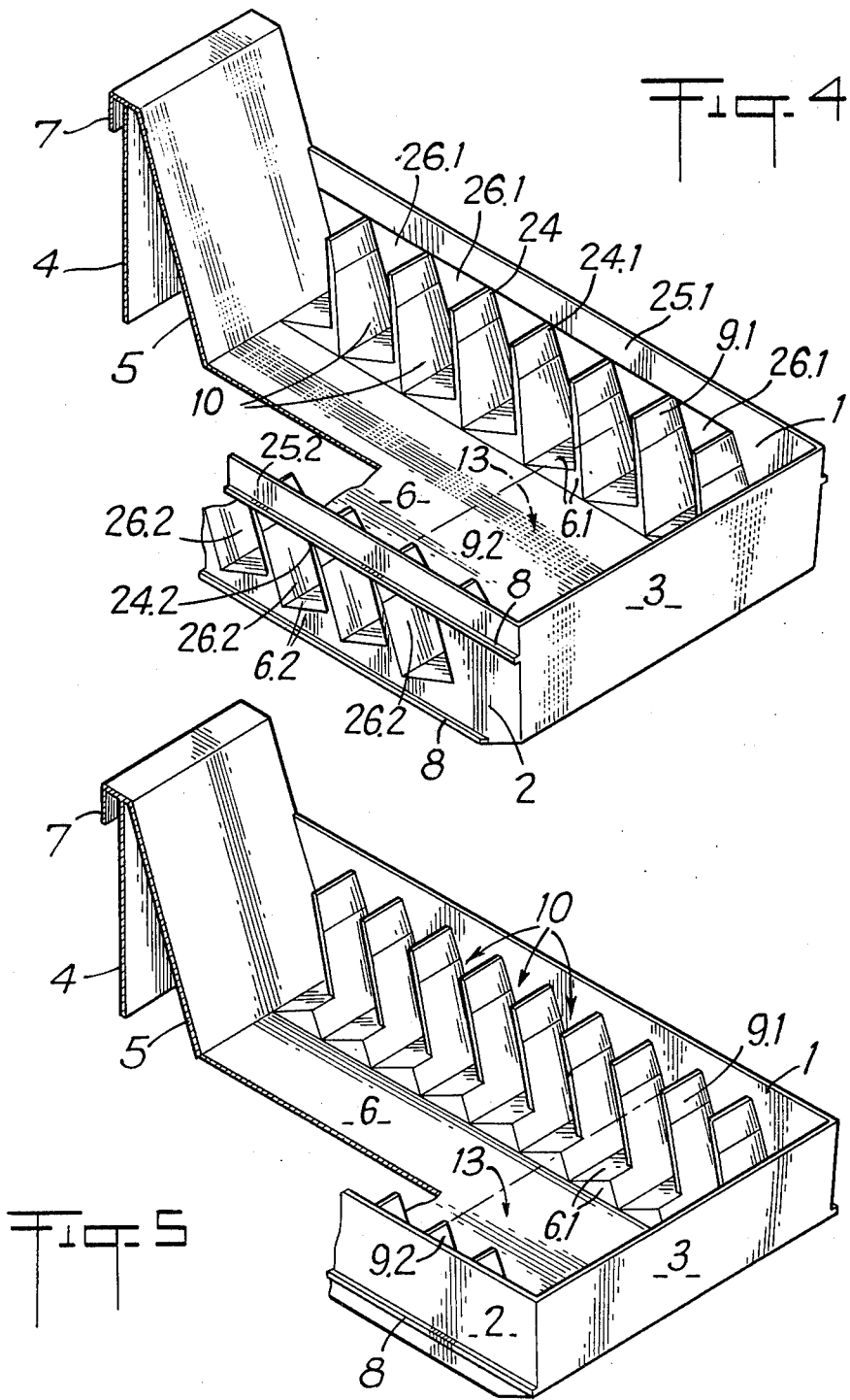

DRAWER UNIT FOR STORING CASES NORMALLY CONTAINING MAGNETIC TAPE CASSETTES

The present invention relates to a drawer unit adapted for storing cases normally containing magnetic tape cassettes.

Such known drawer units are mounted to slide in a fixed cabinet and may be opened in order to have access to the cassette cases contained therein.

The cases are disposed vertically in these drawer units, with the result that it is inconvenient and sometimes impossible to read the title of the work recorded on the corresponding cassette, through the transparent edge portion of any case.

On the other hand, to remove the rearmost cassettes from a drawer unit, it is necessary to extract said drawer unit completely. Moreover, this extraction becomes systematic as it facilitates reading of the titles and subsequent selection.

Finally, the cost of manufacturing the drawer units must be as low as possible, as competition is severe on this market. As the improvements found heretofore which remedy the above drawbacks are complicated and involve an increase in the cost, necessarily leading to a drop in demand, manufacturers have foregone making these improvements.

It is an object of the present invention precisely to obviate the above-mentioned drawbacks by improving the drawer unit so that the resultant advantages are sufficiently attractive and the increase in price sufficiently limited for this new product not only to take its place on the market but also to capture it. However, these improvements must not substantially reduce the storage capacity of the drawer unit.

The side walls and the bottom of the drawer unit are fast with separator partitions defining compartments in which cases may be stored and, in accordance with the invention, said partitions are inclined in manner known per se downwardly to the rear and upwardly to the front, but at such an inclination that only the upper transparent edge portion of the cover of each case is visible and at an incidence suitable for directly and easily reading what is written on the cassette contained in the case in question.

The partitions are inclined by 20° to 30°, and preferably by 25°, with respect to the vertical.

According to a first embodiment of the drawer unit made from moulded plastics material, the partitions are in two aligned parts separated from each other by a gap, these parts being fast, by their substantially vertical edge, with the side walls of this drawer unit; a serrated bottom is further fast with the bottom inner corner of the partitions to allow free passages to exist therebetween, so that the mould may be in two parts only, which are mobile in opposition, one of these parts passing through said passages.

According to a second embodiment of the drawer unit made from moulded plastics material, the partitions are in two aligned parts separated from each other by a gap, these parts being fast, by their base, with serrated elements extending a flat median bottom and, by their top outer corners, with upper strips forming the above-mentioned side walls, with the result that the mould may be constituted by two parts mobile in opposition, and by two other parts also mobile in opposition, but in a direction perpendicular to the preceding one, to retract by the outside, and passing through passages made beneath the strips between the partitions.

According to a third embodiment of the drawer unit made from moulded plastics material, the partitions are in two aligned parts separated from each other by a gap, these parts being fast, by their substantially vertical edge, with the side walls of the drawer unit and, by their base, with serrated elements extending a flat median bottom, with the result that the mould may be constituted by first and second parts mobile in opposition, and by third and fourth parts also mobile in opposition but in a direction perpendicular to the preceding one, to retract by the inside, the first being sloping and being inserted, in order to control them, between the third and fourth which then penetrate in the free spaces made between the partitions.

The invention will be more readily understood on reading the following description with reference to the accompanying drawings, in which:

FIGS. 1 and 2 are longitudinal sections taken along lines I—I and II—II respectively of FIG. 3.

FIG. 3 is a part perspective view illustrating a first embodiment of the drawer unit according to the invention. FIGS. 3A and 3B are schematic part longitudinal sections of the two-part mould for manufacturing the drawer unit of FIG. 3.

FIG. 4 is a part perspective view illustrating a second embodiment of the drawer unit according to the invention.

FIG. 4A is a schematic part transverse half-section of the four-part mould for manufacturing the drawer unit of FIG. 4.

FIG. 5 is a part perspective view illustrating a third embodiment of the drawer unit according to the invention.

FIG. 5A is a schematic part transverse section of the four- or six-part mould for manufacturing the drawer unit of FIG. 5.

Referring now to the drawings, FIGS. 1 to 3 show the drawer unit according to the invention which comprises two side walls 1 and 2, a rear wall 3, a front wall 4, 5 and a bottom 6 forming an integral unit.

The front wall is double: it presents a front panel 4 which is substantially vertical and an inclined support panel 5 connected together in their upper zone of convergence by a flanged strip 7. The strip forms a handle provided with a locking member (not shown) which normally cooperates with a corresponding member carried by the cabinet in which the drawer unit is to slide; moreover, the drawer unit may be guided by means of runners 8 projecting outwardly from the side walls 1 and 2 and adapted to move in translation in grooves provided in said cabinet.

The support panel 5 is fast with the bottom 6 and it is inclined downwardly to the rear and upwardly to the front. The inclination "a" of this panel with respect to the front panel 4, i.e. with respect to the vertical, is between 20° and 30° and preferably equal to 25°.

The height H of the support panel 5, measured along a line of greatest inclination, is slightly more than that of a cassette case, so that such a case abutting against this panel and resting on the bottom 6 does not project with respect to the front panel and may consequently penetrate in the cabinet without hindrance.

It is clear that, in this inclined position, the transparent top of the tape cassette's cover is inclined downwardly to the front in the manner of a desk, so that it is very easy to read what is written thereon, generally the title of the work recorded.

Furthermore, the height h of the side walls 1 and 2, measured from the bottom 6, is between one third and two thirds of the height H.1 of the front panel 4. It is then easy to take the cassette cases out individually, as they project beyond said side walls.

Furthermore, according to the invention, the drawer unit comprises a plurality of separator partitions 9 fast with the bottom 6 and with the side walls 1, 2 and extending parallel to the inclined support panel 5. The partitions 9 define with one another and with said inclined panel compartments 10 for storing the cases. The height h.1 of these partitions is between 30% and 250% of the height h of the side walls 1 and 2; it is preferably equal to 0.95 when h=0.56 H.

Finally, the bottom 6 presents, over at least a part of its width, a serrated section (FIG. 1) of which certain portions 11 extend the partitions 9 and the other portions 12 are perpendicular thereto. This stair-like section ensures an excellent support for the lower edge portion of the cases and a perfect stability thereof, whilst rigidifying the drawer unit, with a minimum consumption of plastics material.

According to the first embodiment illustrated in FIGS. 1 to 3, each partition 9 is constituted by two aligned parts 9.1 and 9.2 respectively fast with the side walls 1 and 2 and separated from each other by a gap 13 which forms above the bottom 6, sectioned in the form of a horizontal stair 11, 12, a longitudinal trough in which the above-mentioned compartments 10 open out. The parts 9.1 and 9.2 are therefore fast, by their rising outer edges, with the side walls 1 and 2 and, by their bottom inner corners 14, with the corresponding portions 11 of the serrated bottom 6. Moreover, free passages or windows 15 are made in this bottom between the above-mentioned parts of partitions and the side walls, this enabling the drawer to be manufactured with a mould in two parts only.

Such a mould is shown schematically in FIGS. 3A and 3B which illustrate the form of its two parts 16 and 17, at right angles respectively to the serrated bottom 6 and the partitions. In fact, FIG. 3A shows that the top part 16 of the mould is shaped complementarily with respect to the surface of the inner cavity of the drawer unit at the serrated bottom, and the lower part 17 to the outer surface; no portion being undercut, removal from the mould is easy. FIG. 3B shows that the upper and lower parts 16 and 17 of the mould are also shaped complementarily with respect to inner and outer surfaces respectively of the drawer unit at the partitions 9.1 (or 9.2), but that the base teeth 18 of the upper part 16 are defined not only by the upper face 19 of the partitions but also by a face 20 of the mould, and in the same way the top teeth 21 of the lower part 17 are defined not only by the lower face 22 of these partitions, but also by a counter-face 23 of the mould, the face 20 abutting on the counter-face 23 when the mould is closed and connecting the tops of said teeth at an inclination allowing removal from the mould.

According to a second embodiment illustrated in FIG. 4, each partition 9 is constituted by two aligned parts 9.1 and 9.2 separated from each other by a gap 13 which forms a longitudinal trough above a flat bottom 6. The parts of partitions 9.1 are fast, at their base, with a serrated element 6.1 whose section is in the form of a horizontal staircase 11, 12 and extending the flat bottom 6; they are also fast, by their top outer corners 24.1, with an upper strip 25.1 forming with portions integral with the rear wall 3, the front inclined panel 5 and the lower element 6.1, the above-mentioned side wall 1; this embodiment therefore enables passages 26.1 to be made in this wall for a laterally retractable part of a mould, described hereinafter, to pass. Similarly, the parts of partitions 9.2 are fast, at their base, with a serrated elemengt 6.2 extending the flat bottom 6 and, by their top outer corners 24.2, with an upper strip 25.2 constituting the side wall 2; passages 26.2 are made therein for another laterally retractable part of the mould to pass.

The mould for manufacturing the drawer unit according to FIG. 4 is shown in FIG. 4A. It comprises an upper part 27 and a lower part 28, shaped complementarily with respect to each other to define, when they are closed, the whole drawer unit except for the volumes which envelope the partitions 9.1 and 9.2 and the inner surface of the serrated elements 6.1 and 6.2. It also comprises two side parts 29 each provided with a comb-shaped element 30 projecting therefrom, the teeth of which pass through the passages 26.2 (or 26.1) and abut against the upper part 27, when the mould is closed; these teeth fill the compartments 10 up to elements 6.1 and 6.2. The side parts 29 therefore define, by cooperating with the upper and lower parts 27 and 28 in position of closure of the mould, the side walls 1, 2, the partitions 9.1, 9.2 and the serrated elements 6.1 and 6.2.

To open the mould in order to remove the drawer unit which has just been manufactured therein by injection, the upper part 27 is raised by vertical translation in the direction of arrow F.1, the lower part 28 is lowered by vertical translation in the direction of arrow F.2, the left-hand side part 29 is drawn by horizontal translation in the direction of arrow F.3 and the right-hand side part 29 is drawn by horizontal translation in the direction opposite that of arrow F.3.

According to the third embodiment shown in FIG. 5, each partition 9 is constituted by two aligned parts 9.1 and 9.2 separated from each other by a gap 13 which forms a longitudinal trough above a flat bottom 6 bordered by marginal serrated elements 6.1 and 6.2 in the form of horizontal stairs 11, 12. The parts of partitions 9.1 and 9.2 are fast, at their base, with the serrated elements 6.1 and 6.2, but over only part of the width thereof, and, by their outer edges, with the side walls 1 and 2 which are solid over their whole extent. This one-piece, non-perforated drawer unit may be manufactured by means of the mould shown in FIG. 5A.

The mould in question comprises an upper part 31 whose base is shaped complementarily with respect to the flat bottom 6, up to the marginal serrated elements 6.1 and 6.2, and whose sides 32 and 33 are convergent downwardly, these sides forming the edges of said elements. It also comprises two side parts 34 and 35, applied against the sides of the upper part 31 which forms a locking pin when the mould is closed; in this position, the side parts 34 and 35 of the mould define the inside of the side walls 1 and 2 of the drawer unit, the partitions 9.1 and 9.2 and the serrated elements 6.1 and 6.2 thereof. Finally, it comprises a lower part 36 which cooperates with the three preceding parts 31, 34 and 35 to define the outside of the drawer unit; in the example shown where the side walls comprise projecting runners 8, the lower part 36 is limited to the level thereof and is surmounted by two side parts 37 and 38.

To open the mould in order to remove the drawer unit which has just been manufactured by injection of plastics material, the upper part 31 is raised by vertical translation in the direction of arrow F.1 and, at the same time, the side parts 34 and 35 are brought together by horizontal translations in the directions of arrows F.5 and F.6 respectively. At the same time, the lower part 36 is lowered by vertical translation in the direction of arrow F.2 and the side parts 37 and 38 are simultaneously moved apart by horizontal translations in the direction of arrows F.3 and F.4 respectively.

The invention is not limited to the embodiments shown and described in detail, as various modifications may be made thereto without departing from the scope thereof.

The drawer unit, forming the subject matter of the present invention, is applicable to the storage of cases containing magnetic tape cassettes.

What is claimed is:

1. A drawer unit for storing cases normally containing magnetic tape cassettes comprising: a pair of spaced apart side walls; a bottom; and a plurality of inclined separator partitions cooperating with the side walls and bottom to define compartments in which cases may be stored so that the transparent top of their cover is inclined to facilitate reading of what is written on the cassette contained in the case in question; each separator partition being inclined downwardly to the rear and upwardly to the front and comprising two aligned parts which are separated from each other by a gap, each of said parts having a side edge connected to one of said side walls and having a lower edge connected to said bottom of said drawer unit; said bottom presenting, over at least a part of its extent, a serrated section of which certain portions extend the partitions and other sloped portions are perpendicular to and connected to said parts of said partitions, said serrated section facilitating the lower support of the cases and rigidifying the drawer unit.

2. A drawer unit according to claim 1 wherein said other sloped portions of said serrated section of said floor are formed in that part of the floor in said gap between the two aligned parts of each separator partition.

3. A drawer unit according to claim 1 wherein said other sloped portions of said serrated section of said floor are formed only in that part of the floor lying between adjacent parts of adjacent separator partitions.

4. A drawer unit according to claim 1 wherein said other sloped portions of said serrated section of said floor are formed between adjacent parts of adjacent separator partitions and also in that part of the floor in said gap between the two aligned parts of each separator partition.

* * * * *